(12) United States Patent
Metzger et al.

(10) Patent No.: US 12,386,726 B2
(45) Date of Patent: Aug. 12, 2025

(54) PROCESSOR TRACE WITH SUPPRESSION OF PERIODIC TIMING PACKETS FOR LOW DENSITY TRACE SECTIONS

(71) Applicant: Intel Corporation, Santa Clara, CA (US)

(72) Inventors: Markus Metzger, Ulm (DE); Beeman Strong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 17/551,774

(22) Filed: Dec. 15, 2021

(65) Prior Publication Data

US 2023/0185695 A1 Jun. 15, 2023

(51) Int. Cl.
*G06F 11/00* (2006.01)
*G06F 11/362* (2025.01)

(52) U.S. Cl.
CPC .................. *G06F 11/3636* (2013.01)

(58) Field of Classification Search
CPC .................................................. G06F 11/3636
See application file for complete search history.

(56) References Cited

U.S. PATENT DOCUMENTS

| | | | |
|---|---|---|---|
| 9,262,163 B2* | 2/2016 | Kurts | G06F 11/00 |
| 2009/0125756 A1* | 5/2009 | Swaine | G06F 11/3476 |
| | | | 714/45 |
| 2011/0219376 A1 | 9/2011 | Williams et al. | |
| 2014/0189314 A1 | 7/2014 | Kurts et al. | |
| 2016/0011872 A1* | 1/2016 | Opferman | G06F 11/36 |
| | | | 712/226 |
| 2016/0020897 A1* | 1/2016 | Kurts | H04L 43/50 |
| | | | 370/503 |
| 2019/0050041 A1* | 2/2019 | Kurts | G06F 11/3024 |
| 2020/0210320 A1* | 7/2020 | Strong | G06F 11/3636 |

OTHER PUBLICATIONS

Extended European Search Report from European Patent Application No. 22206003.0 notified May 5, 2023, 9 pgs.

* cited by examiner

*Primary Examiner* — Elmira Mehrmanesh
(74) *Attorney, Agent, or Firm* — Essential Patents Group, LLP

(57) ABSTRACT

An embodiment of an integrated circuit may comprise a processor and circuitry coupled to the processor to generate non-timing packets associated with a trace of an execution of code on the processor, generate timing packets associated with the trace of the execution of the code on the processor, wherein the timing packets include at least a full timestamp timing packet and a periodic timing packet, identify a low density section of the trace of the execution of the code on the processor, and suppress generation of periodic timing packets during the identified low density section of the trace of the execution of the code on the processor. Other embodiments are disclosed and claimed.

15 Claims, 13 Drawing Sheets

| | 7 | 6 | 5 | 4 | 3 | 2 | 1 | 0 |
|---|---|---|---|---|---|---|---|---|
| 0 | 0 | 1 | 0 | 1 | 1 | 0 | 0 | 1 |
| 1 | Payload = CTC[N+7:N] | | | | | | | |

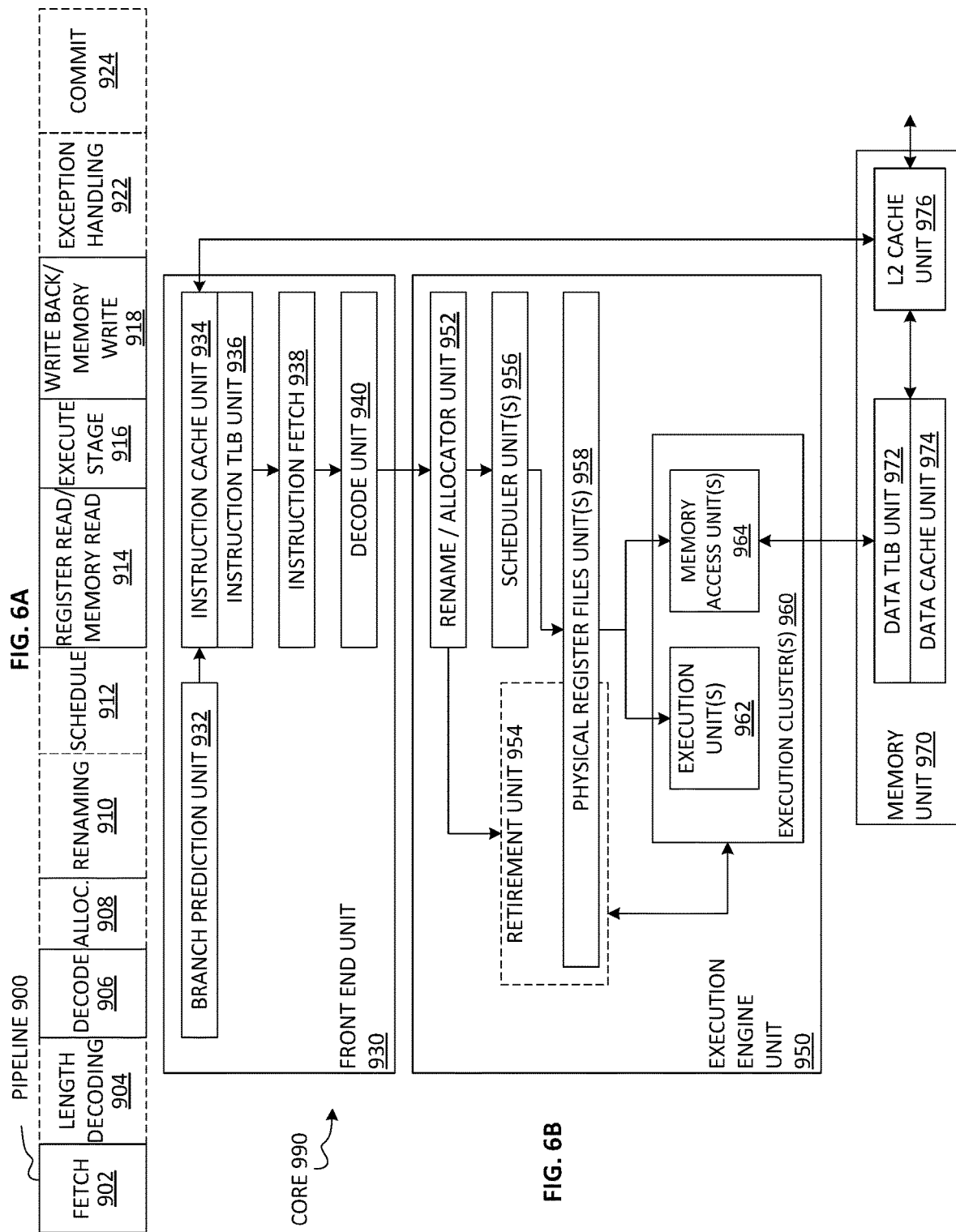

# PROCESSOR TRACE WITH SUPPRESSION OF PERIODIC TIMING PACKETS FOR LOW DENSITY TRACE SECTIONS

BACKGROUND

1. Technical Field

This disclosure generally relates to processor technology, and processor trace technology.

2. Background Art

Complex hardware and/or software create various debug challenges. Trace technology may provide hardware and/or software debug feature that monitors the run-time behavior of execution of code. For example, processor trace technology may provide a hardware real-time monitor that non-intrusively captures events in the processor and saves the trace information where it may be reconstructed and analyzed. Because there may be a large amount of trace information, the trace information is generally compressed by the processor before saving.

INTEL PROCESSOR TRACE (PT) provides software tracing for various INTEL Architecture (IA) processors via hardware within the IA core to capture IA instruction execution and other notable events. In addition, INTEL PT may allow application software to create its own, debug-print style messages. Finally, IA software may write messages directly to a software trace hub. INTEL PT's control flow trace generates a variety of packets that, when combined with the binaries of a program by a post-processing tool, can be used to produce an exact execution trace. The packets record flow information such as instruction pointers (IP), indirect branch targets, and directions of conditional branches within contiguous code regions (basic blocks). INTEL PT can also be configured to log software-generated packets using PTWRITE, and packets describing processor power management events. Further, Precise Event-Based Sampling (PEBS) can be configured to log PEBS records in the INTEL PT trace.

In addition, the packets record other contextual, timing, and bookkeeping information that enables both functional and performance debugging of applications. INTEL PT has several control and filtering capabilities available to customize the tracing information collected and to append other processor state and timing information to enable debugging. For example, there are modes that allow packets to be filtered based on the current privilege level (CPL) or the value of a control register (CR3). Configuration of the packet generation and filtering capabilities are programmed via a set of model-specific registers (MSRs).

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to embodiments of the invention;

FIG. 6B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
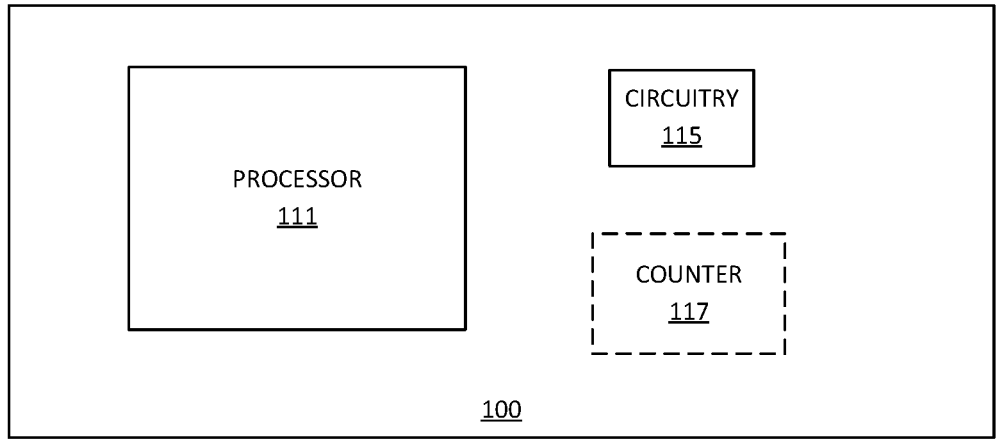
FIG. 1 is a block diagram of an example of an integrated circuit according to an embodiment.

Embodiments discussed herein variously provide techniques and mechanisms for processor trace with suppression of periodic timing packets for low density trace sections. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to trace processor execution of code with suppression of periodic timing packets for low density trace sections.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for reducing the overhead of timing in execution tracing. Execution traces, such as INTEL PROCESSOR TRACE (INTEL PT), ARM ETM, etc., record the control flow of programs in real-time with low overhead. Such execution trace may be a useful tool for both functional debug and performance debug. For performance debug, an execution trace may contain timing information that allows higher-level software to infer the duration of functions, loop nests, or even single iterations inside a loop.

In some implementations, control flow trace generates a variety of packets that, when combined with the binaries of a program by a post-processing tool, can be used to produce the execution trace. Examples of timing packets include full timestamp timing packets (e.g., that provide an indication an absolute wall-clock value, a global timestamp counter value, etc.), periodic timing packets (e.g., that provide periodic indication of the passing of wall-clock time), cycle count timing packets (e.g., that provide indication of the number of processor core clock cycles), etc. Non-timing packets include packet stream boundary packets, paging information packets, core bus ratio packets, overflow packets, packets about control flow information, flow update packets, mode packets, packets inserted by software (e.g., a PTWRITE packet for INTEL PT), etc.

Output of execution tracing can get very large very quickly, because of the high granularity of data provided. Conventional techniques for execution trace may provide filters for control flow content and thereby allow the user to trace only the code of interest, but there are limited conventional techniques to filter periodic timing packets. If the user employs filtering to trace only a section of code that is rarely executed, the periodic timing packets will be generated the entire time tracing is enabled and the user may need to allocate bigger buffers to capture the relevant information. The large number of periodic timing packets may result in a low density trace, where the useful trace data is overwhelmed by the number of periodic timing packets.

Conventionally, the user has options to disable periodic timing packets entirely, or to reduce the frequency of periodic timing packets. These options can address the buffer density issue, but at the expense of losing timing precision in the portion of trace that is high priority. When periodic timing packets are disabled entirely, a full timestamp is needed to resume trace of the control flow. Generating the full timestamp may involve significant overhead because the full timestamp may take dozens of cycles to compute. For short filter durations and frequent switches, this overhead may accumulate to a significant slowdown of the recorded program and hence to high intrusion on the recording. Neither option addresses a scenario where control flow trace is sparse without the use of filtering. Control flow trace may be sparse during execution of code sections that have few branches. Some embodiments overcome one or more of the foregoing problems.

Some embodiments provide technology to avoid generation of a large number of consecutive periodic timing packets during execution of code sections that have few branches, or are otherwise low density sections of execution trace, because there are few control flow packets to which to associate the time. Some embodiments may provide technology to throttle periodic timing packets after other packets have ceased being generated, and restore the frequency of periodic timing packets only after other packets resume generation. Some embodiments may provide hardware technology for suppressing timing packets during low density sections of execution traces. Advantageously, some embodiments may reduce the overhead of time-keeping when accurate time is not necessary (e.g., during filtered-out regions) while still keeping accurate time and thus avoid the overhead of resuming timing with a full timestamp.

With reference to FIG. 1, an embodiment of an integrated circuit 100 may include a processor 111, and circuitry 115 coupled to the processor 111 to generate non-timing packets associated with a trace of an execution of code on the processor 111, generate timing packets associated with the trace of the execution of the code on the processor 111, where the timing packets include at least a full timestamp timing packet and a periodic timing packet, identify a low density section of the trace of the execution of the code on the processor 111, and suppress generation of periodic timing packets during the identified low density section of the trace of the execution of the code on the processor 111. For example, the circuitry 115 may be configured to identify the low density section of the trace of the execution of the code on the processor 111 based on a first threshold number of consecutive periodic timing packets without any intervening non-timing packets. In some embodiments, the circuitry 115 may also be configured to determine a number of suppressed periodic timing packets based on a difference between respective payload values of a current periodic timing packet and an immediately previous periodic timing packet, and to calculate a clock value based on the determined number of suppressed periodic timing packets.

In some embodiments, the circuitry 115 may be further configured to resume generation of periodic timing packets after a non-timing packet is generated. The circuitry 115 may also be configured to resume generation of periodic timing packets if a payload value for a next periodic timing packet corresponds to a pre-determined value. Alternatively, the circuitry 115 may be configured to resume generation of periodic timing packets after a second threshold number of periodic timing packets are suppressed. For example, the integrated circuit 10 may further include an optional counter 117 to count a number of suppressed periodic timing packets, and the circuitry 115 may be further configured to resume generation of periodic timing packets after the counter 117 reaches the second threshold number.

Figure 12:
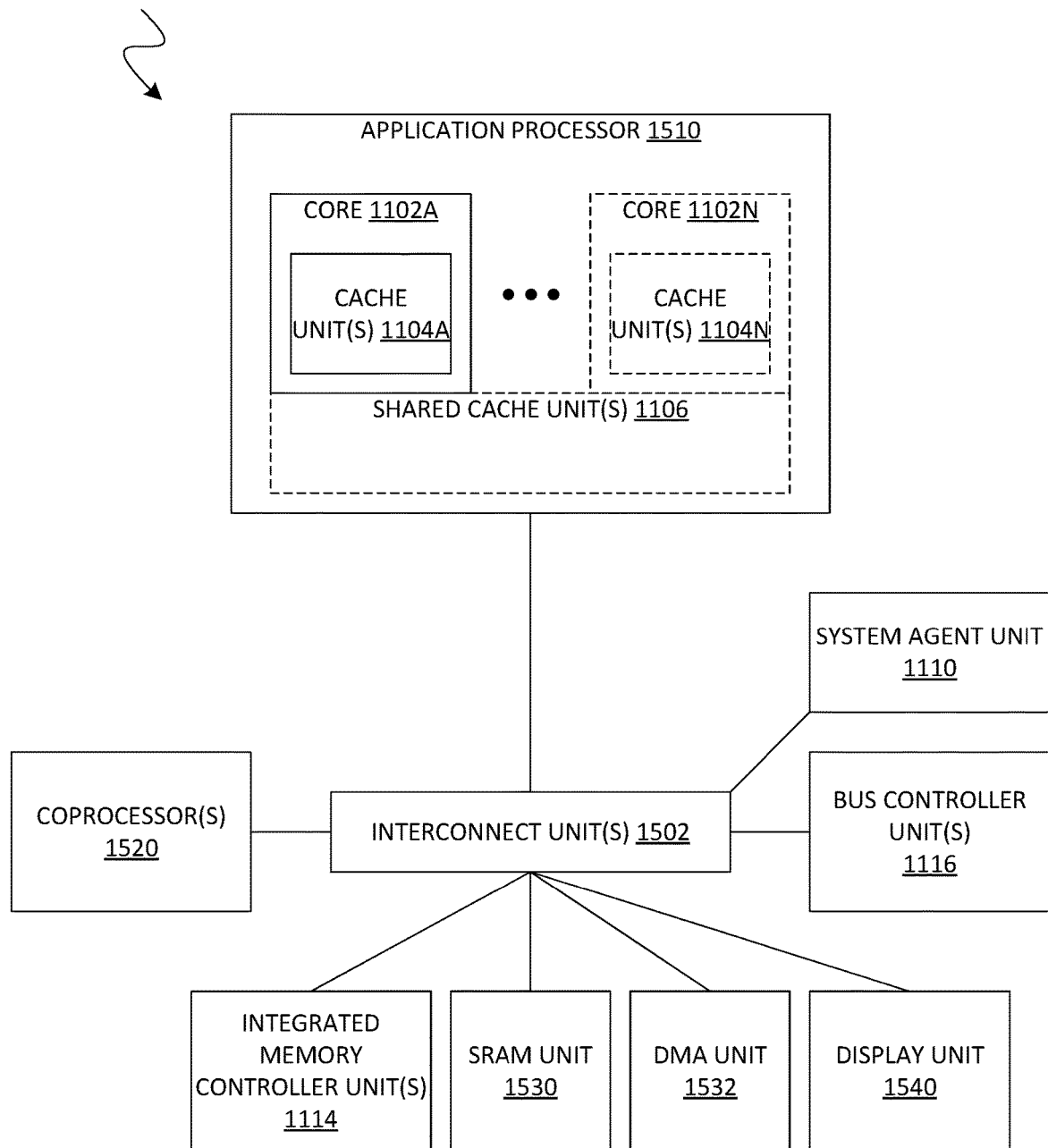
Figure 13:
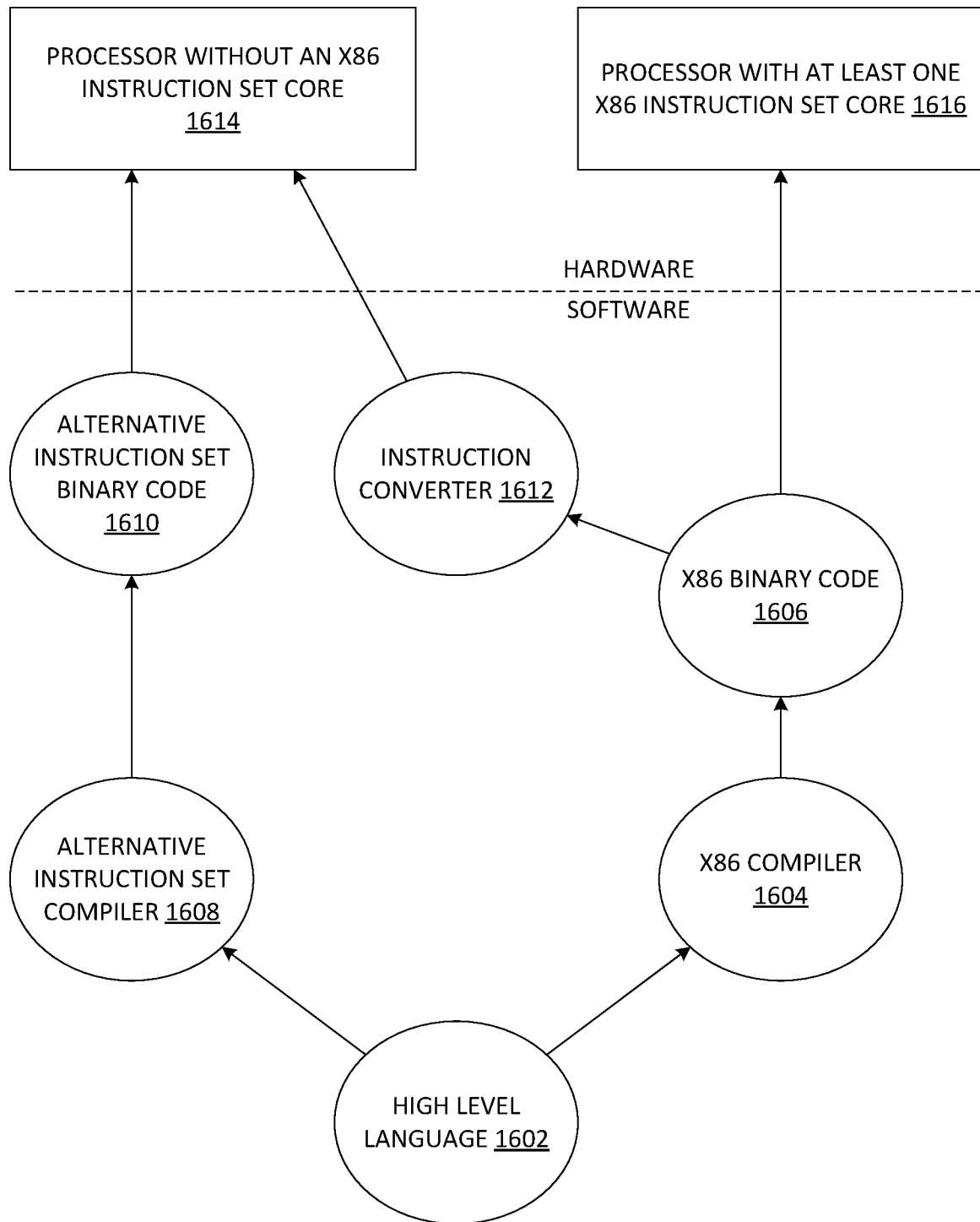
FIG. 13 is a block diagram contrasting the use of a software instruction converter to convert binary instructions in a source instruction set to binary instructions in a target instruction set according to embodiments of the invention.

Embodiments of the circuitry 115 and/or the counter 117 may be integrated with or incorporated in a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13). In particular, embodiments of the circuitry 115 and/or the counter 117 may be incorporated in the front end unit 930 (FIG. 6B).

Figure 2A:
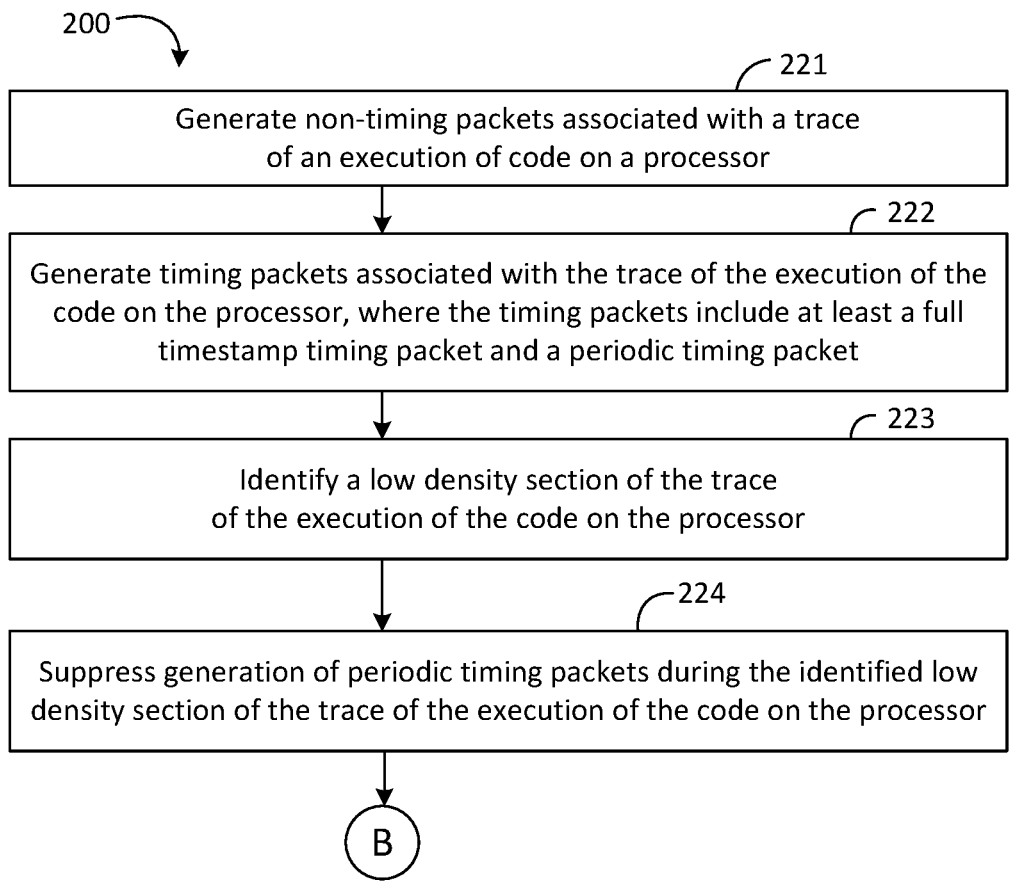
FIGS. 2A to 2B are illustrative diagrams of an example of a method according to an embodiment.
Figure 2B:
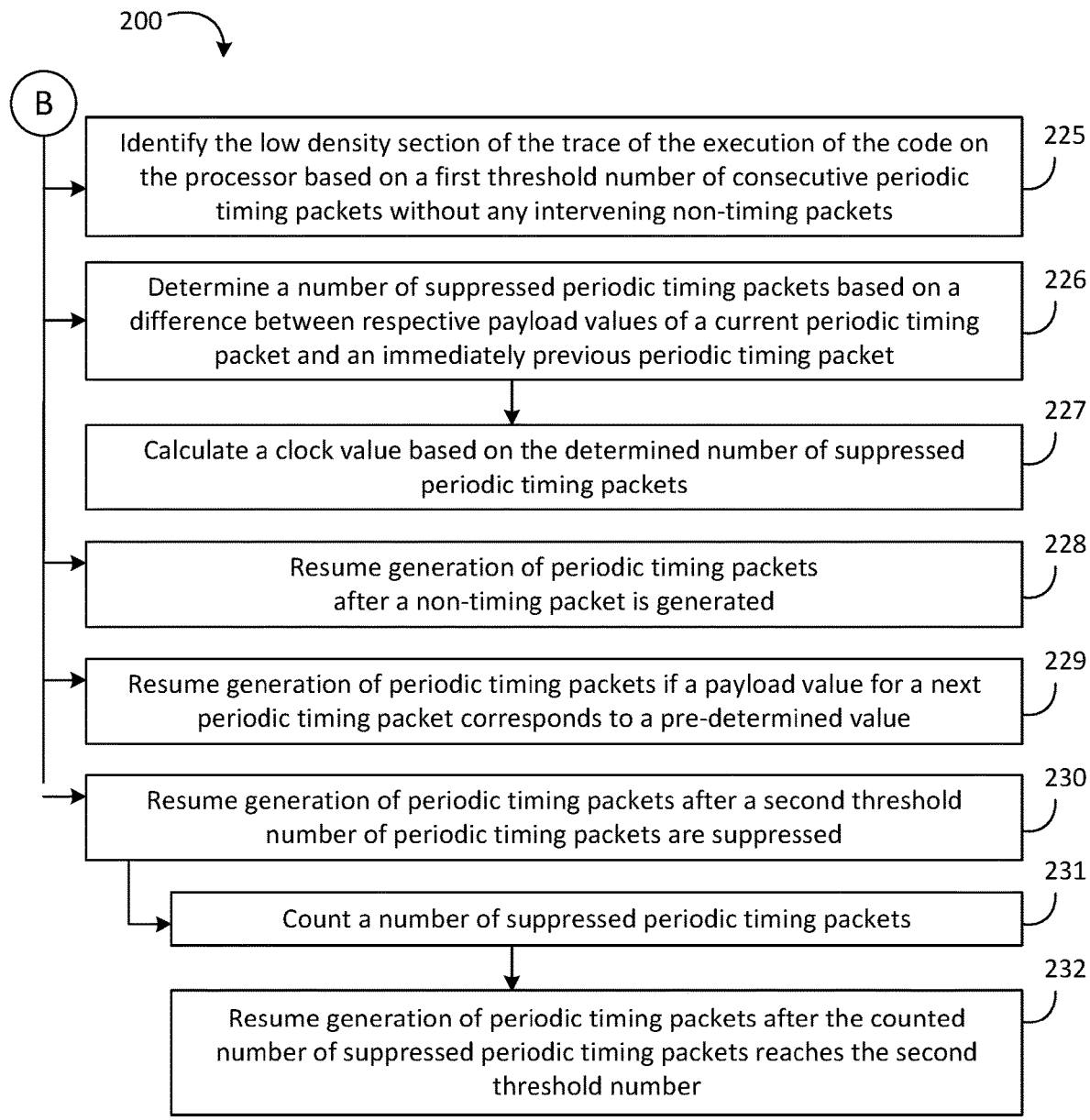

With reference to FIGS. 2A to 2B, although an embodiment of a method 200 is illustrated in the form of a flow diagram, the various aspects described in the boxes are not necessarily performed in any particular order (unless otherwise specified) and some boxes describe further qualifiers of prior aspects and not additional aspects. Embodiments of the method 200 may include generating non-timing packets associated with a trace of an execution of code on a processor at box 221, generating timing packets associated with the trace of the execution of the code on the processor, where the timing packets include at least a full timestamp timing packet and a periodic timing packet at box 222, identifying a low density section of the trace of the execution of the code on the processor at box 223, and suppressing generation of periodic timing packets during the identified low density section of the trace of the execution of the code on the processor at box 224. For example, the method 200 may include identifying the low density section of the trace of the execution of the code on the processor based on a first threshold number of consecutive periodic timing packets without any intervening non-timing packets at box 225. Some embodiments of the method 200 may also include determining a number of suppressed periodic timing packets based on a difference between respective payload values of a current periodic timing packet and an immediately previous periodic timing packet at box 226, and calculating a clock value based on the determined number of suppressed periodic timing packets at box 227.

Some embodiments of the method 200 may further include resuming generation of periodic timing packets after a non-timing packet is generated at box 228, and/or resuming generation of periodic timing packets if a payload value for a next periodic timing packet corresponds to a pre-determined value at box 229 (e.g., generating at least a single cycle timing packet and periodic timing packet pair, as described in further detail below). Alternatively, the method 200 may include resuming generation of periodic timing packets after a second threshold number of periodic timing packets are suppressed at box 230. For example, the method 200 may include counting a number of suppressed periodic timing packets at box 231, and resuming generation of periodic timing packets after the counted number of suppressed periodic timing packets reaches the second threshold number at box 232.

Embodiments of the method 200 may be performed by a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13).

Figures 3, 4:
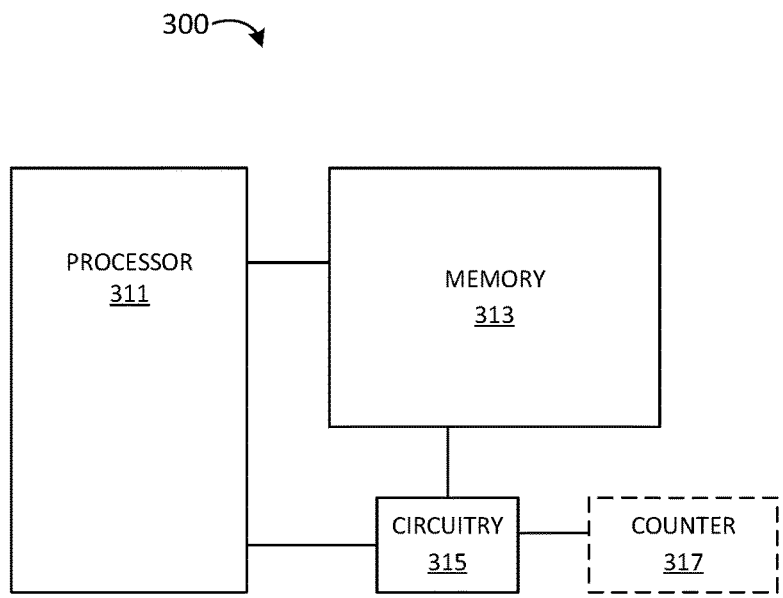
FIG. 3 is a block diagram of an example of an apparatus according to an embodiment.
FIG. 4 is an illustrative diagram of an example of a timing packet according to an embodiment.

With reference to FIG. 3, an embodiment of an apparatus 300 may include a processor 311, memory 313 coupled to the processor 311 to store processor trace information, and circuitry 315 coupled to the processor 311 and the memory 313. The circuitry 315 may be configured to generate non-timing packets associated with a trace of an execution of code on the processor 311, generate timing packets associated with the trace of the execution of the code on the processor 311, where the timing packets include at least a full timestamp timing packet and a periodic timing packet, identify a low density section of the trace of the execution of the code on the processor 311, and suppress generation of periodic timing packets during the identified low density section of the trace of the execution of the code on the processor 311. For example, the circuitry 315 may be configured to identify the low density section of the trace of the execution of the code on the processor based on a first threshold number (e.g., 2 or 3) of consecutive periodic timing packets without any intervening non-timing packets.

The circuitry 315 may also be configured to determine a number of suppressed periodic timing packets based on a difference between respective payload values of a current periodic timing packet and an immediately previous periodic timing packet, and calculate a clock value based on the determined number of suppressed periodic timing packets. In some embodiments, a portion of the circuitry 315 that determines when to start and stop suppressing the periodic timing packets may be integrated with the processor 311, while another portion of the circuitry 315 than calculates the clock values based on the number of suppressed packages may be implemented as part of a trace decoder (e.g., as part of a software tool).

In some embodiments, the circuitry 315 may be further configured to resume generation of periodic timing packets after a non-timing packet is generated, and/or to resume generation of periodic timing packets if a payload value for a next periodic timing packet corresponds to a pre-determined value (e.g., zero). Alternatively, the circuitry 315 may be configured to resume generation of periodic timing packets after a second threshold number (e.g., 255) of periodic timing packets are suppressed. For example, the apparatus 300 may further include an optional counter 317 coupled to the circuitry 315 to count a number of suppressed periodic timing packets, and the circuitry 315 may be further configured to resume generation of periodic timing packets after the counter 317 reaches the second threshold number (e.g., and to reset the counter 317 to zero at the start of the suppression of the periodic timing packets).

Embodiments of the memory 313, the circuitry 315, and/or the counter 317 may be incorporated in or integrated with a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13). In particular, embodiments of the circuitry 315 and/or the counter 317 may be incorporated in the front end unit 930 (FIG. 6B).

INTEL PT uses a stream of packets to record branches as well as synchronous control-flow changes. To keep track of time with low overhead, three example types of timing packets include time-stamp counter (TSC) packets, mini time counter (MTC) packets, cycle count (CYC) packets and TSC/MTC alignment (TMA) packets. TSC packets aid in tracking wall-clock time, and contain some portion of a software-visible time-stamp counter (e.g., a snapshot of the invariant wall-clock time at a relatively high overhead). MTC packets provide periodic indication of the passing of wall-clock time (e.g., a periodic update based on invariant wall-clock time at a very low overhead).

CYC packets provide indication of the number of processor core clock cycles that pass between packets (e.g., updates based on the variable-frequency CPU clock, at a very low overhead but at high frequency). CYC packets may be generated in tandem with other Intel PT packets. The TMA packet provides the information needed to allow the INTEL PT decoder to correlate MTC packets with TSC packets. With the TMA packet, when a MTC packet is encountered, the decoder can determine how many time-stamp counter ticks have passed since the last TSC or MTC packet. A TMA packet is sent immediately following a TSC packet, and the payload values are consistent with the TSC payload value.

A TSC packet provides a baseline wall-clock time. The MTC packets provide an indication the passage of wall-clock time. The CYC packets provide the number of CPU clock cycles that have passed since the last CYC packet. The timing packets provide the ability to associate a time with events (e.g., control flow updates, software inserted packets such as PTWRITE, power state transitions, etc.) logged in the trace. These events are logged using the non-timing packets. Software utilizes the timing packets to compute the wall-clock time at every non-timing packet. This allows accurate time tracking at relatively low overhead.

Because the CPU clock frequency can vary, software will measure the CPU frequency by counting the number of cycles that pass between wall-clock time packets. Using CYC packets and MTC packets together, trace software is able to adjust quickly to any frequency changes and accurately estimate the wall-clock time of any events in the trace.

As noted above, there can be periods of execution with very few traced events (e.g., due to the use of trace filtering mechanisms, the use of low-bandwidth tracing (such as PTWRITE), as a result of code execution with few branches, etc.) and during such periods, it may be undesirable to continue to generate high-granularity timing data in the trace (e.g., without events to which to apply the timing, these packets simply fill the buffer and add performance overhead with limited value). TSC packets, because they are generated only in rare cases, and CYC packets, because they are generated only when other packets are generated, are not problematic in terms of unnecessarily excessive timing packets. But because MTC packets are periodic, MTC packets are generated at the same rate throughout the trace. Execution with few trace events can then result in long streams of trace containing only MTC packets. Some embodiments provide technology to reduce the number of MTC packets generated between traced events, without losing any important timing information.

With reference to FIG. 4, an embodiment of a MTC packet 400 contains an 8 bit payload to store a Core Timer Copy (CTC) value that corresponds to a crystal clock value upon which the MTC period is based. Some embodiments are able to suppress some MTC packets without confusing the decoder because the CTC value stored in the payload of the MTC packet may be utilized to determine how many MTC packets were suppressed and to calculate the wall clock time. If any MTC packets are lost, a suitably configured decoder can determine how many MTC packets were lost, and hence how much time has passed, by using this payload. Because the size of the payload in this example is 8 bits, the maximum number of consecutive lost MTC packets that can be recovered is 255. With the decoder configured to account for lost MTC packets, some embodiments configure the processor drop MTC packets after the processor has generated N consecutive MTC packets, where N is generally a low threshold number such as 2 or 3. In some embodiments, N consecutive CYC+MTC packet pairs also trigger MTC suppression, because the CYC packets are merely byproducts of the MTC packet generation.

Figure 5A:
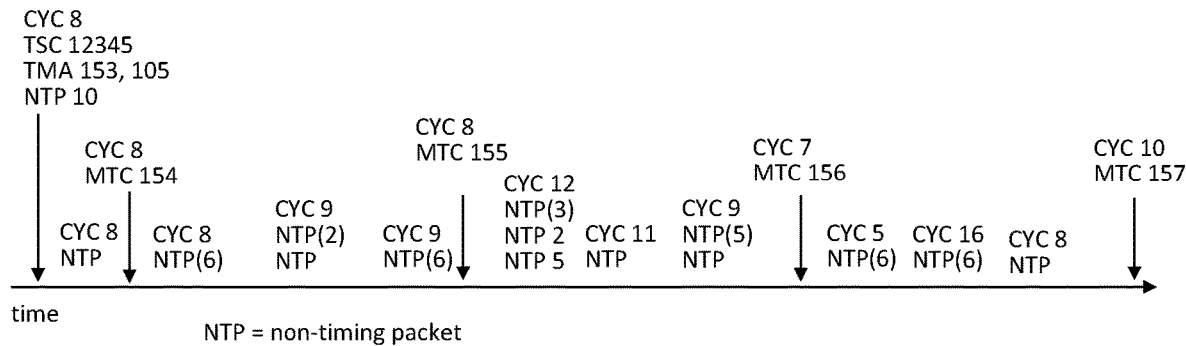
FIGS. 5A to 5F are illustrative diagrams of example timelines of packet generation according to embodiments.
Figure 5B:
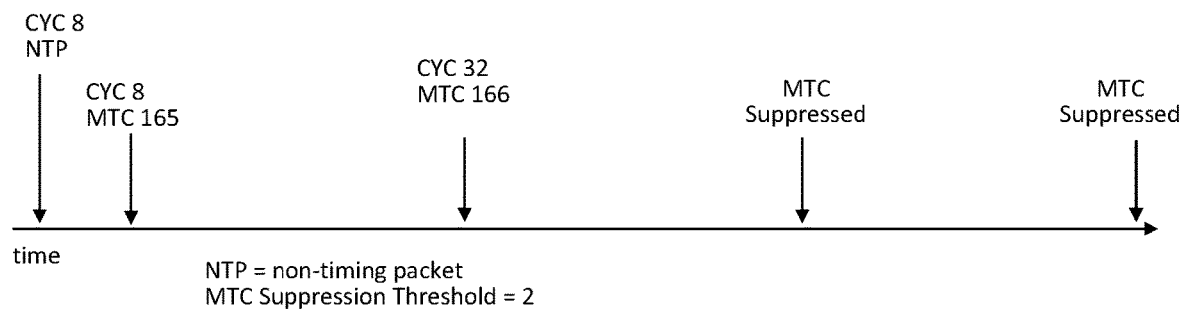

With reference to FIGS. 5A to 5F, illustrative timelines show example packet generation in accordance with some embodiments. In FIG. 5A, an example trace includes non-timing packets (denoted as "NTP" in FIGS. 5A to 5F) interspersed with timing packets (denoted as TSC. TMA, MTC, and CYC in FIGS. 5A to 5F). Because there is active NTP generation in FIG. 5A, MTC packet generation is not suppressed. In FIG. 5B, a MTC Suppression Threshold value is 2, and after two consecutive MTC packets are generated with no intervening non-timing packets, MTC packets are suppressed.

Figure 5C:
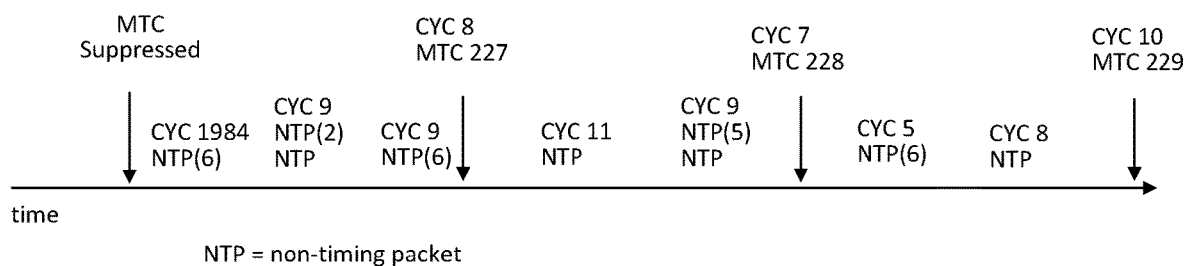

To determine when to resume MTC generation, there are several considerations. MTC packet generation should resume whenever non-timing packets are generated. In FIG. 5C, the timeline shows that MTC packet generation resumes following the generation of NTP packets.

Figure 5D:
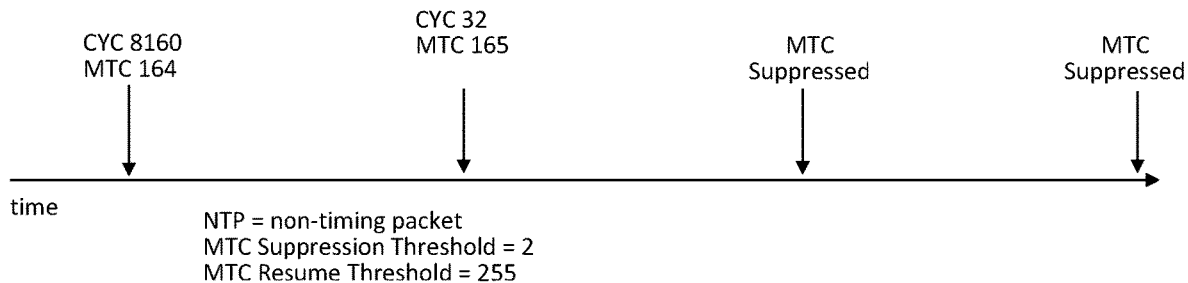

For the decoder and/or other execution trace tools to correctly calculate wall-clock time, no more than 255 consecutive MTC packets may be suppressed, in this example. In FIG. 5D, a MTC resume threshold value is 255, and after 255 consecutively suppressed MTC packets (e.g., from the timeline in FIG. 5B) the timeline shows that MTC packet generation resumes. With no intervening NTP packets, the timeline shows that MTC packets are again suppressed after two consecutive MTC packets are generated (e.g., MTC Suppression Threshold=2). In some embodiments, a counter may be added to the hardware, to resume MTC packet generation after counting 255 consecutively suppressed MTC packets.

Figure 5E:
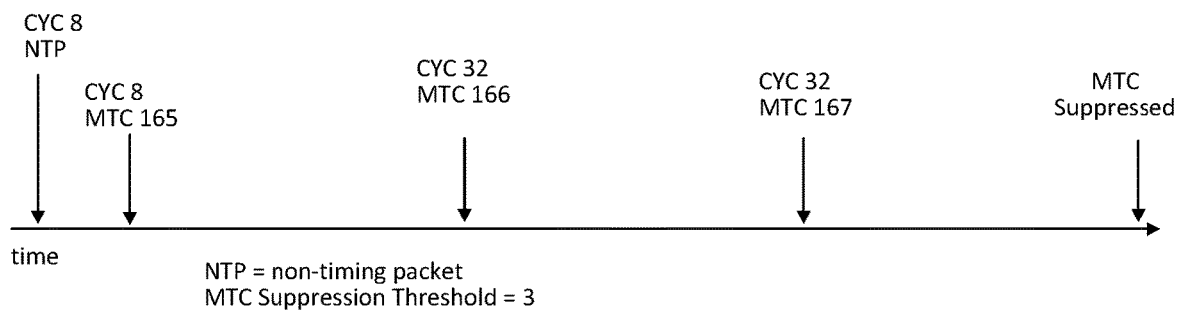
Figure 5F:
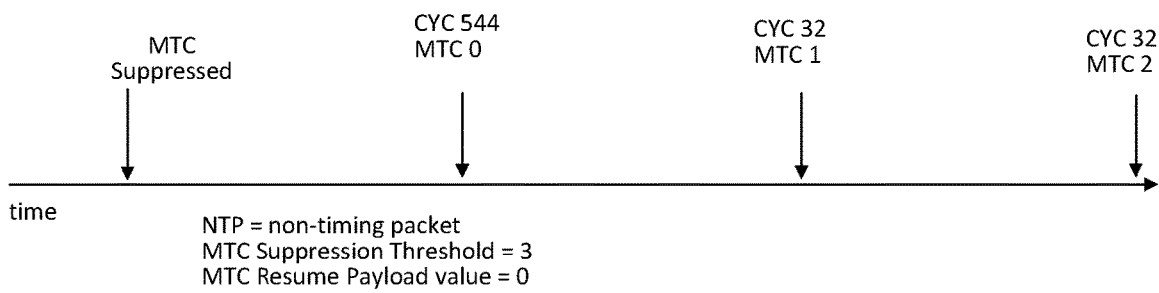

In a lower cost alternative (e.g., without a counter), some embodiments may ensure that no more than 255 consecutive MTC are suppressed by resuming MTC packet generation whenever the payload for the MTC packet is a predetermined value. For example, some embodiments may always generate an MTC packet when the payload value is 0. In FIG. 5E, with no intervening NTP packets, the timeline shows that MTC packets are suppressed after three consecutive MTC packets are generated (e.g., MTC Suppression Threshold=3). In FIG. 5F, the timeline shows that MTC packet generation is resumed when the payload value of the MTC packet is 0. If there are no intervening NTP packets, MTC packets would again be suppressed after the illustrated three consecutive MTC packets are generated (e.g., MTC Suppression Threshold=3).

Another consideration is a trade-off between cost/complexity and accuracy. For better accuracy, the next traced event should be preceded by at least two MTC packets, to ensure that the frequency leading up to the event can be measured.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 6B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7A:
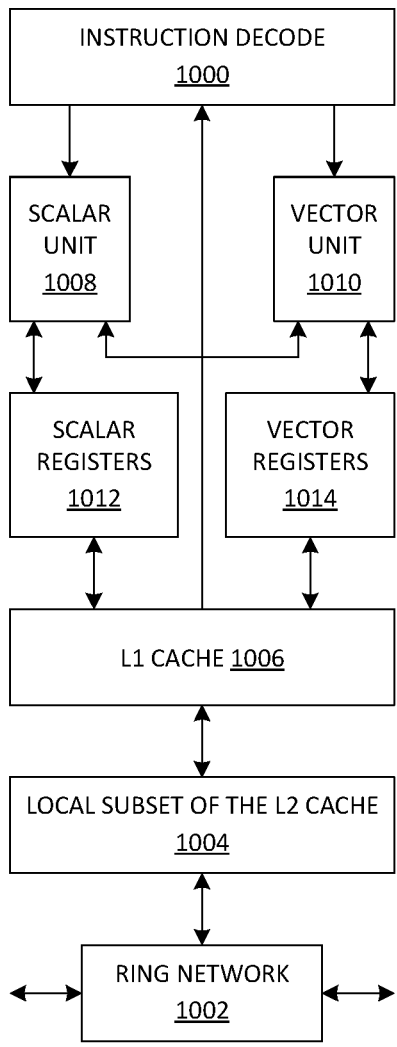
FIGS. 7A-B illustrate a block diagram of a more specific exemplary in-order core architecture, which core would be one of several logic blocks (including other cores of the same type and/or different types) in a chip.
Figure 7B:
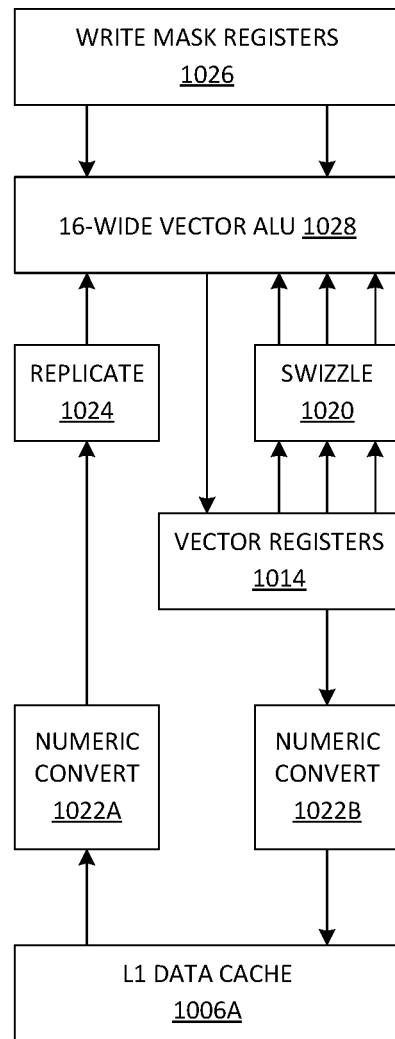

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 8:
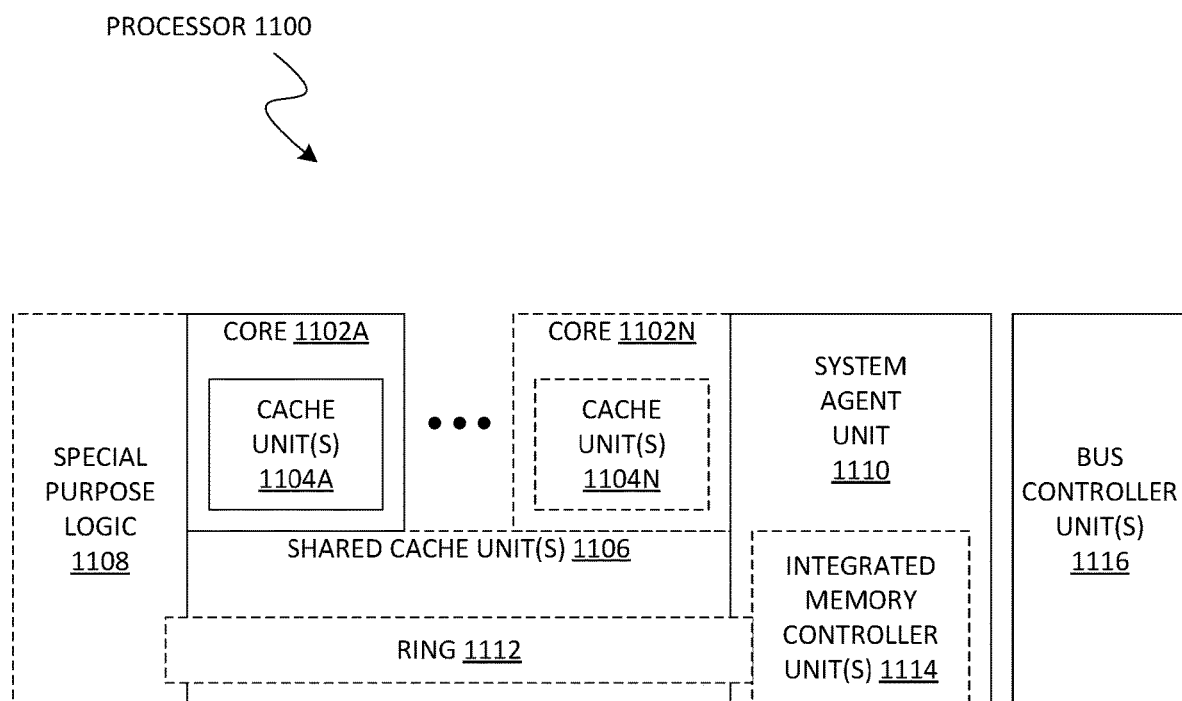
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
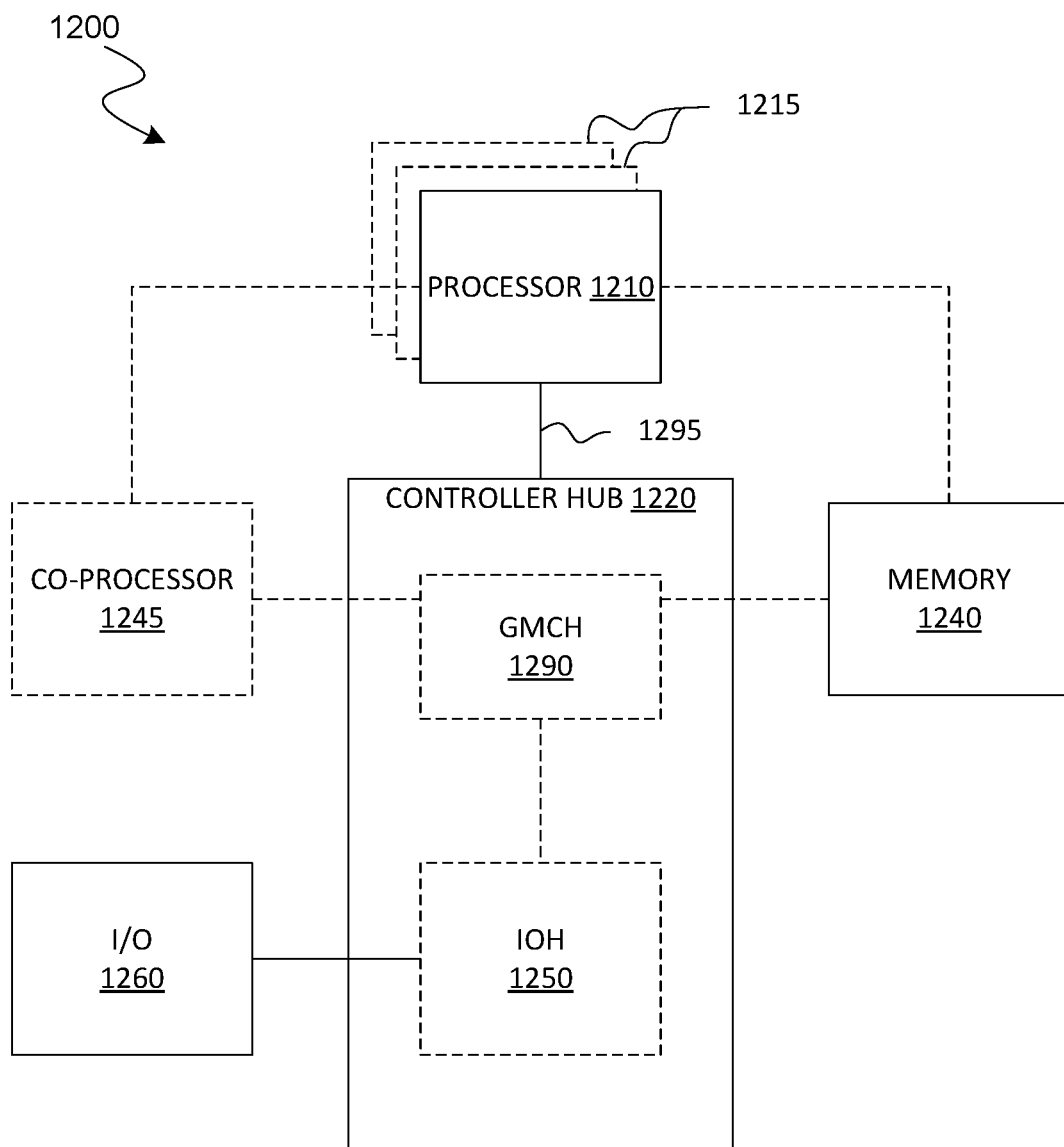
FIGS. 9-12 are block diagrams of exemplary computer architectures.

Referring now to FIG. 9, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 10:
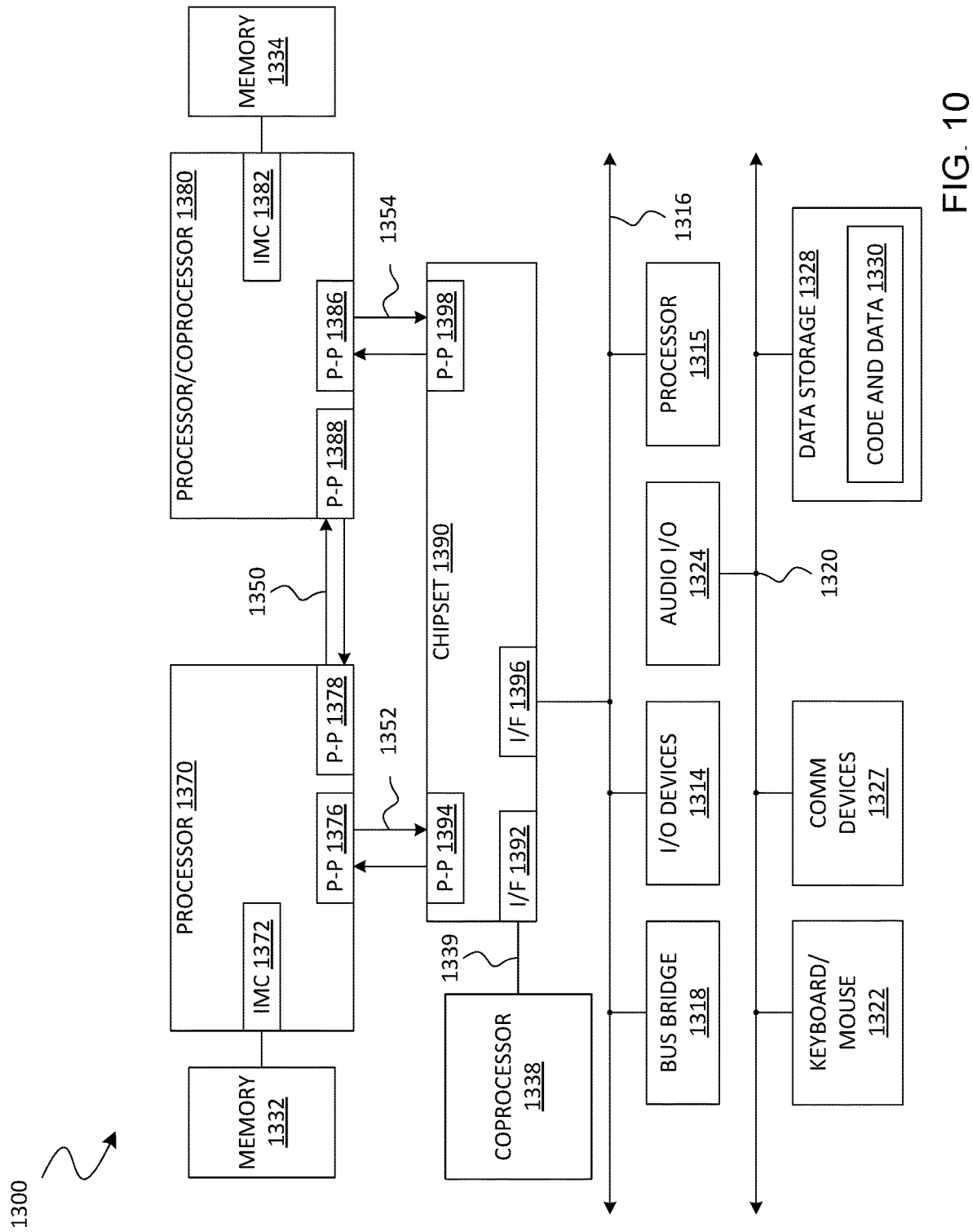

Referring now to FIG. 10, shown is a block diagram of a first more specific exemplary system 1300 in accordance with an embodiment of the present invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

Figure 11:
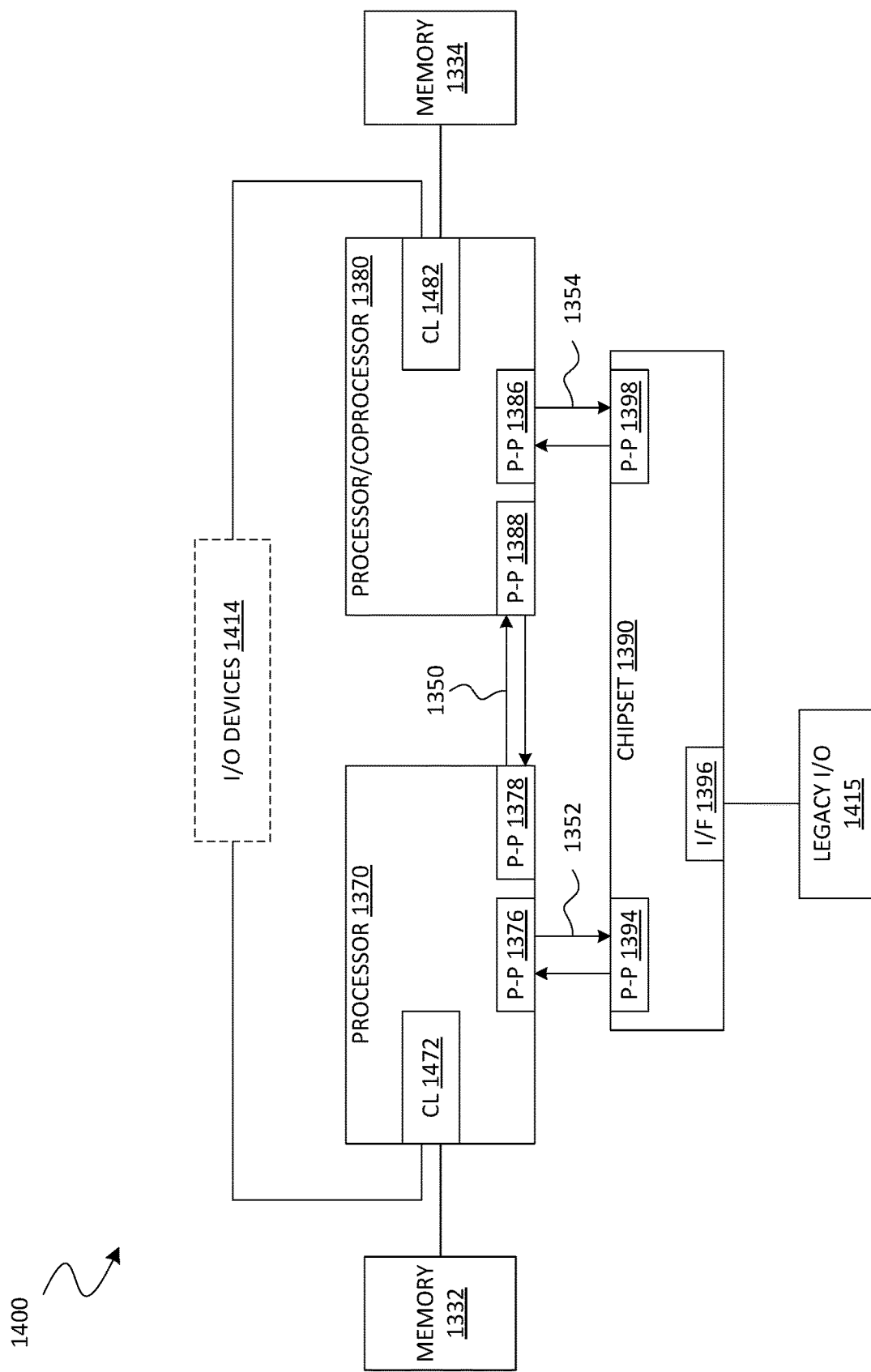

Referring now to FIG. 11, shown is a block diagram of a second more specific exemplary system 1400 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1472 and 1482, respectively. Thus, the CL 1472, 1482 include integrated memory controller units and include I/O control logic. FIG. 11 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 12, shown is a block diagram of a SoC 1500 in accordance with an embodiment of the present invention. Similar elements in FIG. 8 bear like reference numerals. Also, dashed lined boxes are optional features on more advanced SoCs. In FIG. 12, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 13 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for processor trace with suppression of periodic timing packets for low density trace sections are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an integrated circuit, comprising a processor, and circuitry coupled to the processor to generate non-timing packets associated with a trace of an execution of code on the processor, generate timing packets associated with the trace of the execution of the code on the processor, wherein the timing packets include at least a full timestamp timing packet and a periodic timing packet, identify a low density section of the trace of the execution of the code on the processor, and suppress generation of periodic timing packets during the identified low density section of the trace of the execution of the code on the processor.

Example 2 includes the integrated circuit of Example 1, wherein the circuitry is further to identify the low density section of the trace of the execution of the code on the processor based on a first threshold number of consecutive periodic timing packets without any intervening non-timing packets.

Example 3 includes the integrated circuit of any of Examples 1 to 2, wherein the circuitry is further to determine a number of suppressed periodic timing packets based on a difference between respective payload values of a current periodic timing packet and an immediately previous periodic timing packet, and calculate a clock value based on the determined number of suppressed periodic timing packets.

Example 4 includes the integrated circuit of any of Examples 1 to 3, wherein the circuitry is further to resume generation of periodic timing packets after a non-timing packet is generated.

Example 5 includes the integrated circuit of any of Examples 1 to 4, wherein the circuitry is further to resume generation of periodic timing packets if a payload value for a next periodic timing packet corresponds to a pre-determined value.

Example 6 includes the integrated circuit of any of Examples 1 to 4, wherein the circuitry is further to resume generation of periodic timing packets after a second threshold number of periodic timing packets are suppressed.

Example 7 includes the integrated circuit of Example 6, further comprising a counter to count a number of suppressed periodic timing packets, wherein the circuitry is further to resume generation of periodic timing packets after the counter reaches the second threshold number.

Example 8 includes a method, comprising generating non-timing packets associated with a trace of an execution of code on a processor, generating timing packets associated with the trace of the execution of the code on the processor, wherein the timing packets include at least a full timestamp timing packet and a periodic timing packet, identifying a low density section of the trace of the execution of the code on the processor, and suppressing generation of periodic timing packets during the identified low density section of the trace of the execution of the code on the processor.

Example 9 includes the method of Example 8, further comprising identifying the low density section of the trace of the execution of the code on the processor based on a first threshold number of consecutive periodic timing packets without any intervening non-timing packets.

Example 10 includes the method of any of Examples 8 to 9, further comprising determining a number of suppressed periodic timing packets based on a difference between respective payload values of a current periodic timing packet and an immediately previous periodic timing packet, and calculating a clock value based on the determined number of suppressed periodic timing packets.

Example 11 includes the method of any of Examples 8 to 10, further comprising resuming generation of periodic timing packets after a non-timing packet is generated.

Example 12 includes the method of any of Examples 8 to 11, further comprising resuming generation of periodic timing packets if a payload value for a next periodic timing packet corresponds to a pre-determined value.

Example 13 includes the method of any of Examples 8 to 11, further comprising resuming generation of periodic timing packets after a second threshold number of periodic timing packets are suppressed.

Example 14 includes the method of Example 13, further comprising counting a number of suppressed periodic timing packets, and resuming generation of periodic timing packets after the counted number of suppressed periodic timing packets reaches the second threshold number.

Example 15 includes an apparatus, comprising a processor, memory coupled to the processor to store processor trace information, and circuitry coupled to the processor and the memory to generate non-timing packets associated with a trace of an execution of code on the processor, generate timing packets associated with the trace of the execution of the code on the processor, wherein the timing packets include at least a full timestamp timing packet and a periodic timing packet, identify a low density section of the trace of the execution of the code on the processor, and suppress generation of periodic timing packets during the identified low density section of the trace of the execution of the code on the processor.

Example 16 includes the apparatus of Example 15, wherein the circuitry is further to identify the low density section of the trace of the execution of the code on the processor based on a first threshold number of consecutive periodic timing packets without any intervening non-timing packets.

Example 17 includes the apparatus of any of Examples 15 to 16, wherein the circuitry is further to determine a number of suppressed periodic timing packets based on a difference between respective payload values of a current periodic timing packet and an immediately previous periodic timing packet, and calculate a clock value based on the determined number of suppressed periodic timing packets.

Example 18 includes the apparatus of any of Examples 15 to 17, wherein the circuitry is further to resume generation of periodic timing packets after a non-timing packet is generated.

Example 19 includes the apparatus of any of Examples 15 to 18, wherein the circuitry is further to resume generation of periodic timing packets if a payload value for a next periodic timing packet corresponds to a pre-determined value.

Example 20 includes the apparatus of any of Examples 15 to 18, wherein the circuitry is further to resume generation of periodic timing packets after a second threshold number of periodic timing packets are suppressed.

Example 21 includes the apparatus of Example 20, further comprising a counter to count a number of suppressed periodic timing packets, wherein the circuitry is further to resume generation of periodic timing packets after the counter reaches the second threshold number.

Example 22 includes an apparatus, comprising means for generating non-timing packets associated with a trace of an execution of code on a processor, means for generating timing packets associated with the trace of the execution of the code on the processor, wherein the timing packets include at least a full timestamp timing packet and a periodic timing packet, means for identifying a low density section of the trace of the execution of the code on the processor, and means for suppressing generation of periodic timing packets during the identified low density section of the trace of the execution of the code on the processor.

Example 23 includes the apparatus of Example 22, further comprising means for identifying the low density section of the trace of the execution of the code on the processor based on a first threshold number of consecutive periodic timing packets without any intervening non-timing packets.

Example 24 includes the apparatus of any of Examples 22 to 23, further comprising means for determining a number of suppressed periodic timing packets based on a difference between respective payload values of a current periodic timing packet and an immediately previous periodic timing packet, and means for calculating a clock value based on the determined number of suppressed periodic timing packets.

Example 25 includes the apparatus of any of Examples 22 to 24, further comprising means for resuming generation of periodic timing packets after a non-timing packet is generated.

Example 26 includes the apparatus of any of Examples 22 to 25, further comprising means for resuming generation of periodic timing packets if a payload value for a next periodic timing packet corresponds to a pre-determined value.

Example 27 includes the apparatus of any of Examples 22 to 25, further comprising means for resuming generation of periodic timing packets after a second threshold number of periodic timing packets are suppressed.

Example 28 includes the method of Example 27, further comprising means for counting a number of suppressed periodic timing packets, and means for resuming generation of periodic timing packets after the counted number of suppressed periodic timing packets reaches the second threshold number.

Example 29 includes at least one non-transitory machine readable medium comprising a plurality of instructions that, in response to being executed on a computing device, cause the computing device to generate non-timing packets associated with a trace of an execution of code on a processor, generate timing packets associated with the trace of the execution of the code on the processor, wherein the timing packets include at least a full timestamp timing packet and a periodic timing packet, identify a low density section of the trace of the execution of the code on the processor, and suppress generation of periodic timing packets during the identified low density section of the trace of the execution of the code on the processor.

Example 30 includes the at least one non-transitory machine readable medium of Example 29, comprising a plurality of further instructions that, in response to being executed on the computing device, cause the computing device to identify the low density section of the trace of the execution of the code on the processor based on a first threshold number of consecutive periodic timing packets without any intervening non-timing packets.

Example 31 includes the at least one non-transitory machine readable medium of any of Examples 29 to 30, comprising a plurality of further instructions that, in response to being executed on the computing device, cause the computing device to determine a number of suppressed periodic timing packets based on a difference between respective payload values of a current periodic timing packet and an immediately previous periodic timing packet, and calculate a clock value based on the determined number of suppressed periodic timing packets.

Example 32 includes the at least one non-transitory machine readable medium of any of Examples 29 to 31, comprising a plurality of further instructions that, in response to being executed on the computing device, cause the computing device to resume generation of periodic timing packets after a non-timing packet is generated.

Example 33 includes the at least one non-transitory machine readable medium of any of Examples 29 to 32, comprising a plurality of further instructions that, in response to being executed on the computing device, cause the computing device to resume generation of periodic timing packets if a payload value for a next periodic timing packet corresponds to a pre-determined value.

Example 34 includes the at least one non-transitory machine readable medium of any of Examples 29 to 32, comprising a plurality of further instructions that, in response to being executed on the computing device, cause the computing device to resume generation of periodic timing packets after a second threshold number of periodic timing packets are suppressed.

Example 35 includes the at least one non-transitory machine readable medium of Example 34, comprising a plurality of further instructions that, in response to being executed on the computing device, cause the computing device to count a number of suppressed periodic timing packets, and resume generation of periodic timing packets after the counted number of suppressed periodic timing packets reaches the second threshold number.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMS, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
   a processor; and
   circuitry coupled to the processor, the circuitry to:
     generate packets associated with a trace of an execution of code on the processor, the packets comprising:
       a first plurality of packets which are each of a first timing packet type, wherein packets of the first timing packet type are to be generated on a periodic basis; and
       a second plurality of packets which are each of a second timing packet type, wherein packets of the second timing packet type are to be generated each to provide a timestamp corresponding to a respective packet of a non-timing packet type;
     identify a first event wherein a threshold number of multiple packets of the first plurality of packets are generated without any generation of an intervening packet of the non-timing packet type;
     based on the first event, suppress generation of one or more of the first plurality of packets on the periodic basis during the trace;
     resume generation of the one or more of the first plurality of packets on the periodic basis;
     perform a calculation of a number of suppressed packets of the first timing packet type based on a difference between respective payload values of a first packet of the first plurality of packets and a respective immediately previous packet of the first plurality of packets; and
     calculate a clock value based on the calculation of the number of suppressed packets of the first timing packet type.

2. The integrated circuit of claim 1, wherein the circuitry is to resume generation of the one or more of the first plurality of packets on the periodic basis after a non-timing packet is generated.

3. The integrated circuit of claim 1, wherein the circuitry is to resume generation of the one or more of the first plurality of packets on the periodic basis based on an indication that a payload value of one of the first plurality of packets corresponds to a pre-determined value.

4. The integrated circuit of claim 1, wherein the circuitry is to resume generation of the one or more of the first plurality of packets on the periodic basis after a second threshold number of packets are suppressed.

5. The integrated circuit of claim 4, further comprising:
   a counter to count the number of suppressed packets of the first timing packet type, wherein the circuitry is to resume generation of the one or more of the first plurality of packets on the periodic basis after the counter reaches the second threshold number.

6. A method, comprising:
   generating packets associated with a trace of an execution of code on a processor, the packets comprising:
     a first plurality of packets which are each of a first timing packet type, wherein packets of the first timing packet type are to be generated on a periodic basis; and
     a second plurality of packets which are each of a second timing packet type, wherein packets of the second timing packet type are to be generated each to provide a timestamp corresponding to a respective packet of a non-timing packet type;
   identifying a first event wherein a threshold number of multiple packets of the first plurality of packets are generated without any generation of an intervening packet of the non-timing packet type; and
   based on the first event, suppressing generation of one or more of the first plurality of packets on the periodic basis during the trace;
   resuming generation of the one or more of the first plurality of packets on the periodic basis;
   performing a calculation of a number of suppressed packets of the first timing packet type based on a difference between respective payload values of a first packet of the first plurality of packets and a respective immediately previous packet of the first plurality of packets; and
   calculating a clock value based on the calculation of the number of suppressed packets of the first timing packet type.

7. The method of claim 6, wherein generation of the one or more of the first plurality of packets on the periodic basis resumes after a non-timing packet is generated.

8. The method of claim 6, wherein generation of the one or more of the first plurality of packets on the periodic basis resumes based on an indication that a payload value for a next periodic timing packet corresponds to a pre-determined value.

9. The method of claim 6, wherein generation of the one or more of the first plurality of packets on the periodic basis resumes after a second threshold number of periodic timing packets are suppressed.

10. The method of claim 9, further comprising:
    counting the number of suppressed packets of the first timing packet type, wherein generation of the one or more of the first plurality of packets on the periodic basis resumes after the number of suppressed packets of the first timing packet type reaches the second threshold number.

11. An apparatus, comprising:
a processor;
memory coupled to the processor to store processor trace information; and
circuitry coupled to the processor and the memory, the circuitry to:
- generate packets associated with a trace of an execution of code on the processor, the packets comprising:
  - a first plurality of packets which are each of a first timing packet type, wherein packets of the first timing packet type are to be generated on a periodic basis; and
  - a second plurality of packets which are each of a second timing packet type, wherein packets of the second timing packet type are to be generated each to provide a timestamp corresponding to a respective packet of a non-timing packet type;
- identify a first event wherein a threshold number of multiple packets of the first plurality of packets are generated without any generation of an intervening packet of the non-timing packet type;
- based on the first event, suppress generation of one or more of the first plurality of packets on the periodic basis during the trace;
- resume generation of the one or more of the first plurality of packets on the periodic basis;
- perform a calculation of a number of suppressed packets of the first timing packet type based on a difference between respective payload values of a first packet of the first plurality of packets and a respective immediately previous packet of the first plurality of packets; and
- calculate a clock value based on the calculation of the number of suppressed packets of the first timing packet type.

12. The apparatus of claim 11, wherein the circuitry is to resume generation of the one or more of the first plurality of packets on the periodic basis after a non-timing packet is generated.

13. The apparatus of claim 11, wherein the circuitry is to resume generation of the one or more of the first plurality of packets on the periodic basis based on an indication that a payload value of one of the first plurality of packets corresponds to a pre-determined value.

14. The apparatus of claim 11, wherein the circuitry is to resume generation of the one or more of the first plurality of packets on the periodic basis after a second threshold number of packets are suppressed.

15. The apparatus of claim 14, further comprising:
a counter to count the number of suppressed packets of the first timing packet type, wherein the circuitry is to resume generation of the one or more of the first plurality of packets on the periodic basis after the counter reaches the second threshold number.

* * * * *